United States Patent
Leskinen et al.

(10) Patent No.: US 10,723,870 B2
(45) Date of Patent: Jul. 28, 2020

(54) PROCESS FOR PRODUCING HETEROPHASIC COPOLYMERS OF PROPYLENE

(71) Applicant: BOREALIS AG, Vienna (AT)

(72) Inventors: Pauli Leskinen, Helsinki (FI); Johanna Lilja, Porvoo (FI); Jingbo Wang, Linz (AT); Markus Gahleitner, Neuhofen/Krems (AT)

(73) Assignee: BOREALIS AG, Vienna (AT)

(*) Notice: Subject to any disclaimer, the term of this patent is extended or adjusted under 35 U.S.C. 154(b) by 248 days.

(21) Appl. No.: 15/552,466

(22) PCT Filed: Feb. 18, 2016

(86) PCT No.: PCT/EP2016/053430
§ 371 (c)(1),
(2) Date: Aug. 21, 2017

(87) PCT Pub. No.: WO2016/131907
PCT Pub. Date: Aug. 25, 2016

(65) Prior Publication Data
US 2018/0244904 A1  Aug. 30, 2018
US 2019/0315953 A9  Oct. 17, 2019

(30) Foreign Application Priority Data
Feb. 20, 2015 (EP) .................... 15155854

(51) Int. Cl.
- C08L 23/14 (2006.01)
- C08F 210/06 (2006.01)
- C08F 10/06 (2006.01)
- F16L 9/12 (2006.01)

(52) U.S. Cl.
CPC .......... C08L 23/142 (2013.01); C08F 10/06 (2013.01); C08F 210/06 (2013.01); F16L 9/12 (2013.01); C08L 2203/18 (2013.01); C08L 2205/02 (2013.01); C08L 2205/025 (2013.01); C08L 2205/03 (2013.01); C08L 2207/02 (2013.01)

(58) Field of Classification Search
CPC ............ C08L 23/142; C08L 2203/18; C08L 2205/02; C08L 2205/025; C08L 2205/03; C08L 2207/02; C08F 210/06; C08F 10/06; F16L 9/12
USPC ...................................... 525/52
See application file for complete search history.

(56) References Cited

U.S. PATENT DOCUMENTS

| | | | |
|---|---|---|---|
| 3,324,093 A | 6/1967 | Alleman | |
| 3,405,109 A | 10/1968 | Rohlfing | |
| 4,532,311 A | 7/1985 | Fulks et al. | |
| 4,543,399 A | 9/1985 | Jenkins et al. | |
| 4,578,879 A | 4/1986 | Yokoyama et al. | |
| 4,582,816 A | 4/1986 | Miro | |
| 4,621,952 A | 11/1986 | Aronson | |
| 4,803,251 A | 2/1989 | Goode et al. | |
| 4,855,370 A | 8/1989 | Chirillo et al. | |
| 4,933,149 A | 6/1990 | Rhee et al. | |
| 5,026,795 A | 6/1991 | Hogan | |
| 5,391,654 A | 2/1995 | Ahvenainen et al. | |
| 2016/0075865 A1* | 3/2016 | Hedesiu | C08L 23/14 428/36.9 |
| 2016/0122449 A1* | 5/2016 | Wang | C08F 10/06 526/124.9 |

FOREIGN PATENT DOCUMENTS

| EP | 47077 A1 | 3/1982 |
|---|---|---|
| EP | 188125 A2 | 7/1986 |
| EP | 250169 A2 | 12/1987 |
| EP | 560035 A2 | 12/1987 |
| EP | 261027 A1 | 3/1988 |
| EP | 0372239 A2 | 6/1990 |

(Continued)

OTHER PUBLICATIONS

Geldart et al., "The Design of Distributors for Gas-fluidized Beds", Powder Technology, vol. 42, 1985.

(Continued)

*Primary Examiner* — Michael Bernshteyn
(74) *Attorney, Agent, or Firm* — Insigne LLP

(57) ABSTRACT

A process for producing a heterophasic copolymer composition comprising polymerising in multiple steps and multiple polymerisation reactors propylene monomer and a comonomer selected from ethylene, alpha-olefins having 4 to 10 carbon atoms and their mixtures, in the presence of an olefin polymerisation catalyst comprising a solid catalyst component and a co-catalyst, wherein the solid catalyst component comprises titanium, magnesium, halogen and an internal donor of the formula (I):

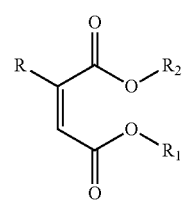

wherein $R_1$ and $R_2$ are the same or different being a linear or branched $C_1$-$C_{12}$-alkyl group and R is hydrogen or a linear, branched or cyclic $C_1$ to $C_{12}$-alkyl.

12 Claims, No Drawings

(56) References Cited

FOREIGN PATENT DOCUMENTS

| | | | | |
|---|---|---|---|---|
| EP | 0479186 | A2 | 4/1992 | |
| EP | 579426 | A1 | 1/1994 | |
| EP | 600414 | A1 | 6/1994 | |
| EP | 683176 | A1 | 11/1995 | |
| EP | 707513 | A1 | 4/1996 | |
| EP | 721798 | A2 | 7/1996 | |
| EP | 696293 | B1 | 2/1998 | |
| EP | 684871 | A | 5/1998 | |
| EP | 887379 | A | 12/1998 | |
| EP | 887380 | A | 12/1998 | |
| EP | 887381 | A | 12/1998 | |
| EP | 891990 | A2 | 1/1999 | |
| EP | 1415999 | A1 | 5/2004 | |
| EP | 1591460 | A | 11/2005 | |
| EP | 991684 | A | 1/2006 | |
| EP | 1860125 | A | 11/2007 | |
| EP | 2368922 | A1 | 9/2011 | |
| EP | 2368922 | A1 * | 9/2011 | .......... C08L 2666/08 |
| EP | 2368922 | A1 * | 12/2011 | ............... C08K 3/00 |
| EP | 2610271 | A | 7/2013 | |
| EP | 2610272 | A1 | 7/2013 | |
| EP | 2539398 | B1 | 10/2014 | |
| EP | 2796472 | A | 10/2014 | |
| EP | 2796473 | A | 10/2014 | |
| EP | 2796474 | A1 * | 10/2014 | ............ C08L 23/142 |
| EP | 2796474 | A1 | 10/2014 | |
| EP | 2796501 | A1 | 10/2014 | |
| EP | 7296474 | A1 * | 10/2014 | ............. C08L 23/14 |
| GB | 1272778 | A | 5/1972 | |
| WO | 94/25495 | A1 | 11/1994 | |
| WO | 00/29452 | A1 | 5/2000 | |
| WO | 699213 | B1 | 5/2000 | |
| WO | 00/68315 | A1 | 11/2000 | |
| WO | 02/088194 | A1 | 11/2002 | |
| WO | 2005/087361 | A | 9/2005 | |
| WO | 2007/025640 | A1 | 3/2007 | |
| WO | 2012/007430 | A | 1/2012 | |
| WO | 2014/187686 | A1 | 11/2014 | |
| WO | 2015/139875 | A1 | 9/2015 | |

OTHER PUBLICATIONS

Geldart et al., "Gas Fluidization Technology", J. Wiley & Sons, 1986, Chapters 2.4 and 2.5, pp. 17-18 and Chapters 7.3 to 7.5 pp. 169-186, and 183.

International Search Report of International Application No. PCT/EP2016/053430 dated May 27, 2016.

Written Opinion of International Application No. PCT/EP2016/053430 dated May 27, 2016.

Notification Concerning Transmittal of International Preliminary Report on Patentability and Written Opinion of the International Searching Authority; PCT/EP2016/053430 dated Aug. 22, 2017.

* cited by examiner

PROCESS FOR PRODUCING HETEROPHASIC COPOLYMERS OF PROPYLENE

FIELD OF THE INVENTION

The present invention is directed to a process for producing propylene polymers. In specific, the present invention is directed to a process for producing impact-resistant copolymers of propylene. The present invention is also directed to a process for producing heterophasic copolymers of propylene comprising a semicrystalline matrix and an amorphous copolymer phase dispersed within the matrix. The present invention is further directed to a process suitable for making pipes having good low-temperature toughness.

Problem to be Solved

EP-A-2796472 discloses a process where propylene is polymerised in two stages so that a low molecular weight propylene homopolymer is produced in the first stage and a high molecular weight propylene copolymer is produced in the second stage.

EP-A-2796473 discloses a process where propylene was polymerised in three stages. In the first stage a low molecular weight homopolymer of propylene was produced, in the second stage a high molecular weight copolymer was produced and in the third stage a copolymer of propylene was produced containing from 10 to 40% by mole, preferably from 15 to 30% by mole of comonomer units.

EP-A-2610271 discloses a solid catalyst component for propylene polymerisation. The catalyst contains an internal donor which is a compound selected from benzoates, alkylene glycol dibenzoates, maleates, 1-cyclohexene-1,2-dicarboxylic dialkylesters and 1,3-diethers, or a mixture of any of such compounds.

SUMMARY OF THE INVENTION

As seen from one aspect, the present invention provides a process for producing a heterophasic copolymer composition comprising propylene monomer and a comonomer selected from ethylene, alpha-olefins having 4 to 10 carbon atoms and their mixtures, in the presence of an olefin polymerisation catalyst comprising a solid catalyst component further comprising titanium, magnesium, halogen and an internal donor, and a cocatalyst, the process comprising the steps of: (1) introducing streams of the solid catalyst component, the cocatalyst, propylene monomer and hydrogen into a first polymerisation reactor; (2) producing a first polymer of propylene in the first polymerisation reactor, the first polymer of propylene having a first melt flow rate $MFR_2$ of from 0.1 to 2.0 g/10 min; (3) withdrawing a stream comprising the first polymer of propylene from the first polymerisation reactor and passing it to a second polymerisation reactor; (4) introducing a stream of propylene monomer into the second polymerisation reactor; (5) producing a first polymer mixture comprising the first polymer of propylene and a second polymer of propylene in the second polymerisation reactor, the first polymer mixture having a second melt flow rate $MFR_2$ of from 0.05 to 1.0 g/10 min and which second melt flow rate is less than the first melt flow rate; (6) withdrawing a stream comprising the first polymer mixture from the second polymerisation reactor and passing it to a third polymerisation reactor; (7) introducing streams of propylene monomer and the comonomer into the third polymerisation reactor; (8) producing the heterophasic copolymer composition comprising the first polymer mixture and a third copolymer of propylene in the third polymerisation reactor, the heterophasic copolymer composition having a third melt flow rate $MFR_2$ of from 0.05 to 1.0 g/10 min, said heterophasic copolymer having a content of comonomer units of from 5 to 25% by mole; wherein the amount of xylene soluble fraction in the heterophasic copolymer determined according to ISO 16152 is from 14 to 35% by weight and intrinsic viscosity measured from the amorphous polymer (AM) of the heterophasic copolymer is from 1.5 to 4.4 dl/g; and (9) recovering the heterophasic copolymer composition from the third polymerisation reactor; characterised in that the internal donor is a compound having the structure according to formula (I):

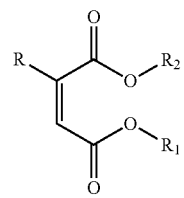

wherein $R_1$ and $R_2$ are the same or different being a linear or branched $C_1$-$C_{12}$-alkyl group and R is hydrogen or a linear, branched or cyclic $C_1$ to $C_{12}$-alkyl.

As seen from another aspect, the present invention provides a heterophasic copolymer obtainable by the process as defined above the heterophasic copolymer comprising (A) a first polymer of propylene, selected from homopolymers of propylene and random copolymers of propylene containing from 0.1 to 5% by mole of a comonomer selected from the group consisting of ethylene, alpha-olefins having from 4 to 10 carbon atoms, and mixtures thereof and having a melt flow rate $MFR_2$ of from 0.1 to 4.0 g/10 min; (B) a second polymer of propylene, selected from homopolymers of propylene and random copolymers of propylene containing from 0.1 to 5% by mole of a comonomer selected from the group consisting of ethylene, alpha-olefins having from 4 to 10 carbon atoms, and mixtures thereof and having a melt flow rate $MFR_2$ of from 0.05 to 0.3 g/10 min and which is less than the $MFR_2$ of the first polymer of propylene; (C) a third polymer of propylene selected from random copolymers of propylene containing from 35 to 75% by mole of units of a comonomer selected from the group consisting of ethylene, alpha-olefins having from 4 to 10 carbon atoms and mixtures thereof; and wherein the heterophasic copolymer contains from 1 to 30 ppm magnesium originating from the catalyst and no phthalic acid esters originating from the catalyst.

As seen from a further aspect, the present invention provides pipes having good low-temperature toughness made of the heterophasic copolymer of propylene as defined above.

DETAILED DESCRIPTION

According to the present invention propylene is polymerised in three reactors. A heterophasic copolymer of propylene with a comonomer selected from ethylene, alpha-olefins having 4 to 10 carbon atoms and their mixtures is produced in the process. Further on, said heterophasic copolymer may be processed into a pipe having good low-temperature toughness.

A heterophasic copolymer comprises at least two phases, a matrix and an elastomeric phase.

The matrix, which is the continuous phase, substantially comprises and preferably consists of a semicrystalline homopolymer of propylene or a random copolymer of propylene with a comonomer selected from ethylene, alpha-olefins having 4 to 10 carbon atoms and their mixtures. By "semicrystalline" is meant that the homopolymer or the random copolymer has a substantial crystallinity. This is indicated, for instance, by the fact that matrix is mostly insoluble in cold xylene determined according to ISO 16152. By "mostly insoluble" is meant that at most 30%, preferably at most 15% and more preferably at most 10% by weight of the matrix is soluble in xylene at 25° C. according to ISO 16152.

By "substantially comprises" is here meant that substantially all, that is, at least 90% by weight, preferably at least 95% by weight and more preferably at least 98% and especially preferably at least 99% by weight of the matrix is formed of the homopolymer of propylene or the random copolymer of propylene with a comonomer selected from ethylene, alpha-olefins having 4 to 10 carbon atoms and their mixtures. It is, however, within the scope of the invention that the matrix consists of two or more homopolymers of propylene and/or random copolymers of propylene as defined above, provided that the overall matrix is semicrystalline and forms a single, continuous phase.

The matrix comprises a higher molecular weight component produced in one polymerisation reactor and a lower molecular weight component produced in another polymerisation reactor.

The elastomeric phase is dispersed into the matrix. The elastomeric phase substantially comprises, preferably consists of, copolymers of propylene with a comonomer selected from ethylene, alpha-olefins having 4 to 10 carbon atoms and their mixtures. The elastomeric phase is substantially amorphous with no crystalline fraction. This is indicated, for instance, by the fact that elastomeric phase is mostly soluble in cold xylene as measured according to ISO 16152. Thus, at least about 80%, preferably at least 85%, more preferably at least 90% and especially preferably at least 95% of the elastomeric phase is soluble in cold xylene as measured according to ISO 16152.

It is within the scope of the invention that the elastomeric phase consists of two or more copolymers of propylene as defined above, provided that the overall elastomeric phase is non-crystalline and is dispersed within the matrix as separate domains.

Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

Especially, according to the present invention the matrix is produced in at least two distinct polymerisation steps in at least two polymerisation reactors and the elastomeric phase is produced in at least one polymerisation step in at least one polymerisation reactor. To avoid unnecessary complexity of the process it is preferred that the matrix is produced in two polymerisation reactors and the elastomeric phase in one or two polymerisation reactors.

Catalyst

Solid Catalyst Component

The solid catalyst component used in the present invention is preferably a solid Ziegler-Natta catalyst component, which comprises compounds of a transition metal of Group 4 to 6 of IUPAC, like titanium, a Group 2 metal compound, like a magnesium and an internal electron donor (ID) being a compound according to formula (I). Thus, the catalyst is fully free of undesired phthalic compounds. Further, the solid catalyst component is free of any external support material, like silica or $MgCl_2$, but the catalyst is self-supported.

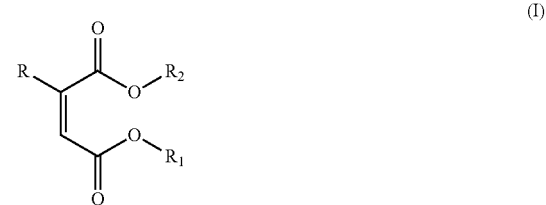

(I)

In the formula (I) above $R_1$ and $R_2$ are the same or different being a linear or branched $C_1$-$C_{12}$-alkyl group and R is hydrogen or a linear, branched or cyclic $C_1$ to $C_{12}$-alkyl.

The solid catalyst component in particulate form is preferably produced by the following general procedure:
a) providing a solution of
  $a_1$) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or
  $a_2$) at least a Group 2 metal alkoxy compound (Ax') being the reaction product of a Group 2 metal compound and an alcohol mixture of the alcohol (A) and a monohydric alcohol (B) of formula $R^3OH$, optionally in an organic liquid reaction medium; or
  $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
  $a_4$) Group 2 metal alkoxy compound of formula $M(OR^4)_n$ $(OR^5)_m X_{2-n-m}$ or mixture of Group 2 alkoxides $M(OR^4)_n X_{2-n'}$ and $M(OR^5)_{m'} X_{2-m'}$, where M is Group 2 metal, X is halogen, $R^4$ and $R^5$ are different alkyl groups of $C_2$ to $C_{16}$ carbon atoms, and $0 \leq n < 2$, $0 \leq m < 2$ and $n+m+(2-n-m)=2$, provided that both n and m are not simultaneously zero, $0 < n' \leq 2$ and $0 < m' \leq 2$; and
b) adding said solution from step a) to at least one compound of a transition metal of Group 4 to 6 and
c) obtaining the solid catalyst component particles,
and adding the internal electron donor compound according to the formula (I) at any step prior to step c).

The internal donor (ID) or precursor thereof is thus added preferably to the solution of step a) or to the transition metal compound before adding the solution of step a).

According to the procedure above the solid catalyst component can be obtained via precipitation method or via emulsion-solidification method depending on the physical conditions, especially temperature used in steps b) and c). Emulsion is also called liquid/liquid two-phase system.

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst preparation process according to emulsion-solidification method is preferably used in the present invention.

Preferably the Group 2 metal is magnesium. The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds (a4)) and used as such in the catalyst preparation process of the invention.

In a preferred embodiment in step a) the solution of $a_2$) or $a_3$) are used, i.e. a solution of (Ax') or a solution of a mixture of (Ax) and (Bx).

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

Illustrative monohydric alcohols (B) are of formula $R^3OH$, with $R^3$ being straight-chain or branched $C_2$-$C_{16}$ alkyl residue, preferably $C_4$ to $C_{10}$, more preferably $C_6$ to $C_8$ alkyl residue The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be similar or different $C_1$-$C_{20}$ alkyls, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present solid catalyst component may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particularly preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is a compound according to formula (I).

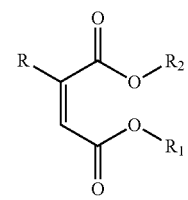

(I)

Preferably R is hydrogen or methyl. Most preferred examples are e.g. substituted maleates and citraconates, especially preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of one or more α-olefin monomers with 2 to 20 carbon atoms, preferably from 6 to 20 carbon atoms. Suitable examples of monomers are 1-octene, 1-nonene, 1-decene, 1-undecene and 1-dodecene and mixtures thereof. Most preferably at least one of the monomers is 1-decene.

The solid particulate product obtained by precipitation or emulsion-solidification method may be washed at least once, preferably at least twice, most preferably at least three times with an aromatic and/or aliphatic hydrocarbons, preferably with toluene, heptane or pentane and/or with $TiCl_4$ Washing solutions can also contain donors and/or compounds of Group 13, like trialkyl aluminium, halogenated alkyl aluminium compounds or alkoxy aluminium compounds. Aluminium compounds can also be added during the catalyst synthesis.

The catalyst can further be dried, as by evaporation or flushing with nitrogen or it can be slurried to an oily liquid without any drying step.

The finally obtained Ziegler-Natta catalyst is desirably in the form of particles having generally an average particle size range of 5 to 200 µm, preferably 10 to 100 µm. Particles are compact with low porosity and have surface area below 20 g/m², more preferably below 10 g/m². Typically the amount of Ti is 1-6 wt-%, Mg 10 to 20 wt-% and donor 10 to 40 wt-% of the catalyst composition.

Detailed description of preparation of solid catalyst components is disclosed in WO-A-2012/007430, EP-A-2610271, EP-A-261027 and EP-A-2610272.

Cocatalyst

The solid catalyst component is combined with a cocatalyst before it is used in the polymerisation. The cocatalyst typically comprises an aluminium alkyl compound and an external electron donor.

The external donor (ED) is preferably present. Suitable external donors (ED) include certain silanes, ethers, esters, amines, ketones, heterocyclic compounds and blends of these. The external donor (ED) is especially preferably a silane.

It is most preferred to use silanes of the general formula

$$R^a_p R^b_q Si(OR^c)_{(4-p-q)} \quad (II)$$

wherein $R^a$, $R^b$ and $R^c$ can be chosen independently from one another and can be the same or different and denote a hydrocarbon radical, in particular an alkyl or cycloalkyl group, and wherein p and q are numbers ranging from 0 to 3 with their sum p+q being equal to or less than 3. Examples of such commonly used silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$.

Another preferred group of silanes have the general formula

$$Si(OCH_2CH_3)_3(NR^d R^e) \quad (III)$$

wherein $R^3$ and $R^4$ can be the same or different a represent a linear, branched or cyclic hydrocarbon group having 1 to 12 carbon atoms.

It is in particular preferred that $R^d$ and $R^e$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl, and most preferably $R^d$ and $R^e$ are ethyl.

In addition to the optional external donor (ED) the co-catalyst comprises an aluminium alkyl compound. The aluminium alkyl compound is preferably an aluminum alkyl or aluminum alkyl halide compound. Accordingly in one specific embodiment the aluminium alkyl compound is a tri-alkylaluminium, like triethylaluminium (TEAL), trimethylaluminium, tri-isobutylaluminium, trioctylaluminium or tri-n-hexylaluminium. In another embodiment the aluminium alkyl compound is a dialkyl aluminium chloride or alkyl aluminium dichloride or mixtures thereof, such as diethylaluminium chloride, dimethylaluminium chloride, ethylaluminium dichloride or ethylaluminium sesquichlorde. Especially preferably the aluminium alkyl compound is triethylaluminium (TEAL).

The ratio of the aluminium alkyl compound (Al) to the external donor (ED) [Al/ED] and/or the ratio of aluminium alkyl compound (Al) to the transition metal (TM) [Al/TM] should be chosen for each combination of aluminium alkyl compound and external donor. The required ratios are well known to the person skilled in the art.

First Polymerisation Reactor

In the first polymerisation reactor the first polymer of propylene, which is the lower molecular weight component of the matrix, is produced in the presence of the polymerisation catalyst, propylene and hydrogen. Optionally, a comonomer may also be present.

In the first polymerisation reactor the polymerisation is preferably conducted as slurry polymerisation. In such a case the reactor may be any reactor suitable for slurry polymerisation, such as a stirred tank reactor or a loop reactor. Preferably the first polymerisation reactor is a loop reactor.

In the first polymerisation reactor the polymerisation is conducted at a temperature which is less than the melting temperature of the polypropylene. The temperature is typically selected to be within the range of from 50 to 100° C., preferably from 55 to 95° C. and more preferably from 60 to 90° C. The pressure is typically from 1 to 150 bar, preferably from 10 to 100 bar. Generally the temperature and the pressure are selected so that the fluid within the reactor forms a single phase, such as a liquid phase or a supercritical phase.

In slurry polymerisation the polymer particles, in which the catalyst is fragmented and dispersed, are suspended in a fluid diluent, typically a liquid diluent. The diluent is typically formed of propylene monomer, which the other reactants, such as hydrogen and comonomer, are dissolved in. The diluent may contain minor amount of inert components, such as propane, which are present as impurities in the reactants.

The first polymer of propylene may be a homopolymer of propylene or a copolymer of propylene with a comonomer selected from ethylene, alpha-olefins having 4 to 10 carbon atoms and their mixtures. If the first polymer of propylene is a copolymer then is the first polymer contains from 0.1 to 6% by mole of units derived from the comonomer and from 94 to 99.9% by mole of propylene units. Preferably, the first polymer then contains from 0.1 to 2% by mole of units derived from the comonomer and from 98 to 99.9% by mole of propylene units. However, preferably the first polymer of propylene is a homopolymer of propylene and does not contain comonomer units.

The first polymer of propylene has a melt index MFR$_2$ of from 0.1 to 4.0 g/10 min. Preferably the melt index MFR$_2$ of the first polymer of propylene is from 0.2 to 3.0 g/10 min and more preferably from 0.2 to 2.0 g/10 min. It is important that the melt index of the first copolymer remains within these limits. If the melt index is greater, then a greater amount of hydrogen would be needed to reach the melt index and a separation step to remove hydrogen would be needed. Otherwise it would not be possible to reach the desired melt index in the second polymerisation stage. On the other hand, a too low melt index of the first polymer of propylene would lead to an insufficiently narrow molecular weight distribution and thus unacceptable polymer properties.

The first polymer of propylene is semicrystalline and not amorphous. Therefore it has a substantial fraction which is not soluble in xylene at 25° C. The first polymer of propylene preferably has a content of xylene soluble fraction of from 0.1 to 10% by weight, preferably from 0.5 to 5% by weight.

The polymerisation in the first polymerisation reactor is preferably conducted in slurry in a loop reactor. Then the polymer particles formed in the polymerisation, together with the catalyst fragmented and dispersed within the particles, are suspended in the fluid hydrocarbon. The slurry is agitated to enable the transfer of reactants from the fluid into the particles. In loop reactors the slurry is circulated with a high velocity along a closed pipe by using a circulation pump. Loop reactors are well known in the art and examples are given, for instance, in U.S. Pat. Nos. 4,582,816, 3,405,109, 3,324,093, EP-A-479186 and U.S. Pat. No. 5,391,654.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. It is, however, preferred to withdraw slurry continuously from the reactor. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerisation stage other components are also introduced as it is known in the art. Thus, hydrogen is used to control the molecular weight of the polymer. Process additives, such as antistatic agent, may be introduced into the reactor to facilitate a stable operation of the process.

Hydrogen feed is typically adjusted to maintain constant hydrogen to propylene ratio within the loop reactor. The ratio is maintained at such a value that the melt index $MFR_2$ of the first copolymer is at the desired value. While the actual value of the required hydrogen to propylene ratio depends, among others, on the catalyst and polymerisation conditions it has been found that when the ratio is within the range of from 0.05 to 1.0 mol/kmol (or, mol/1000 mol), preferably from 0.05 to 0.5 mol/kmol, good results have been obtained.

Comonomer feed, if comonomer is used, is typically adjusted to maintain constant comonomer to propylene ratio within the loop reactor. The ratio is maintained at such a value that the comonomer content of the first copolymer is at the desired value. While the actual value of the required comonomer to propylene ratio depends, among others, on the catalyst, type of comonomer and polymerisation conditions it has been found that when the ratio is within the range of from 0.1 to 2 mol/kmol, preferably from 0.1 to 1 mol/kmol good results have been obtained. However, preferably comonomer is not introduced into the first polymerisation reactor.

According to the present invention the slurry is passed directly from the first polymerisation reactor into the second polymerisation reactor. By "directly" it is meant that the slurry is introduced from the first reactor into the second reactor without a flash step between the reactors for removing at least a part of the reaction mixture from the polymer. Thereby, substantially the entire slurry stream withdrawn from the first polymerisation reactor is passed to the second polymerisation reactor. This kind of direct feed is described in EP-A-887379, EP-A-887380, EP-A-887381 and EP-A-991684. However, it is within the scope of the present invention to take small samples or sample streams from the polymer or from the fluid phase or from both for analysing the polymer and/or the composition of the reaction mixture. As understood by the person skilled in the art, the volume of such sample streams is small compared to the total slurry stream withdrawn from the loop reactor and typically much less than 1% by weight of the total stream, such as at most 0.1% or 0.01% or even 0.001% by weight.

Second Polymerisation Reactor

In the second polymerisation reactor a first polymer mixture comprising the first polymer of propylene and a second polymer of propylene is formed. This is done by introducing the particles of the first polymer, containing active catalyst dispersed therein, together with additional propylene and optionally hydrogen and comonomer into the second polymerisation reactor. This causes the second polymer of propylene to form on the particles containing the first polymer of propylene.

The second polymerisation is preferably conducted in a fluidised bed gas phase reactor. Typically the second polymerisation reactor is then operated at a temperature within the range of from 50 to 100° C., preferably from 65 to 90° C. The pressure is suitably from 10 to 40 bar, preferably from 15 to 30 bar.

The comonomer, if used, is selected from ethylene, alpha-olefins containing 4 to 10 carbon atoms and their mixtures. The comonomer used in the second polymerisation reactor may be the same as or different from the comonomer used in the first polymerisation reactor. Preferably the same comonomer is used in the first and the second polymerisation reactors, if any is used. Especially preferably the comonomer is then ethylene.

Also in the second polymerisation reactor the content of the eventual comonomers is controlled to obtain the desired comonomer content of the first copolymer mixture. If a comonomer is present then typically the first polymer mixture contains from 0.1 to 2% by mole of units derived from the comonomer and from 98 to 99.9% by mole of propylene units. Preferably the copolymer mixture contains from 0.2 to 1% by mole of units derived from the comonomer and from 99 to 99.8% by mole of propylene units. Furthermore, the comonomer content of the copolymer mixture is preferably greater than the comonomer content of the first polymer of propylene. Preferably the ratio of the comonomer content of the first copolymer to the comonomer content of the copolymer mixture (both expressed in mol-%), $C_1/C_b$, is not greater than 0.95, more preferably not greater than 0.9 and especially preferably not greater than 0.8.

Preferably no comonomer is present in the second polymerisation reactor. Thereby the second polymer of propylene is a second homopolymer of propylene. It was also preferred that the first polymer of propylene was the first homopolymer of propylene and thereby the first polymer mixture is preferably the first homopolymer mixture.

The second polymer of propylene produced in the second polymerisation reactor is semicrystalline and not amorphous. Therefore it has a substantial fraction which is not soluble in xylene at 25° C. The first polymer mixture preferably has a content of xylene soluble fraction of from 0.1 to 10% by weight, more preferably from 0.5 to 5% by weight.

The melt index $MFR_2$ of the first polymer mixture is from 0.05 to 2.0 g/10 min. Preferably the melt index $MFR_2$ of the first polymer mixture is from 0.07 to 1.0 g/10 min, more preferably from 0.1 to 0.5 g/10 min. Furthermore, the melt index of the first polymer mixture is less than the melt index of the first polymer of propylene. Preferably, the ratio of the melt index of the first polymer mixture to the melt index of the first polymer of propylene, $MFR_{2,b}/MFR_{2,1}$, has a value of not greater than 0.8, more preferably not greater than 0.7 and in particular not greater than 0.6. Furthermore, preferably the ratio of the melt index of the first polymer mixture to the melt index of the first polymer of propylene, $MFR_{2,b}/MFR_{2,1}$, has a value of at least 0.2, more preferably at least 0.3 and in particular at least 0.35.

As it is well known in the art the melt index MFR$_2$ of the second polymer of propylene produced in the second polymerisation reactor cannot be directly measured because the second polymer of propylene cannot be isolated from the first polymer mixture. However, by knowing the weight fractions of the first and second polymers in the polymer mixture and the melt indices of the first polymer and the polymer mixture it is possible to calculate the MFR$_2$ of the second polymer. This can be done by using the equation $$MI_b = (w_1 \cdot MI_1^{-0.0965} + w_2 \cdot MI_2^{-0.0965})^{-\frac{1}{0.0965}} \qquad \text{(eq. 1)}$$

Where w is the weight fraction of the component in the mixture, MI is the melt index MFR$_2$ and subscripts b, 1 and 2 refer to the mixture, component 1 and component 2, respectively. By calculating the MFR$_2$ of the second polymer of propylene it can be found to lie within the range of from 0.05 to 0.3 g/10 min, preferably 0.1 to 0.3 g/10 min.

Also the comonomer content of the second polymer cannot be directly measured. However, by using the standard mixing rule it can be calculated from the comonomer contents of the copolymer mixture and the first polymer.

$$C_b = w_1 \cdot C_1 + w_2 \cdot C_2 \qquad \text{(eq. 2)}$$

where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \qquad \text{(eq. 3)}$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

The content of the xylene soluble polymer in the second copolymer cannot be directly measured. The content can be estimated, however, by using the standard mixing rule:

$$XS_b = w_1 \cdot XS_1 + w_2 \cdot XS_2 \qquad \text{(eq.4)}$$

where XS is the content of xylene soluble polymer in weight-%, w is the weight fraction of the component in the mixture and subscripts b, 1 and 2 refer to the overall mixture, component 1 and component 2, respectively. The second copolymer typically can be found to have a content of xylene soluble polymer of not greater than 10% by weight, preferably not greater than 5% by weight.

The first polymer mixture preferably comprises from 35 to 60% by weight of the first polymer of propylene and from 40 to 65% by weight of the second polymer of propylene.

When the entire slurry stream from the first polymerisation reactor is introduced into the second polymerisation reactor then substantial amounts of propylene, eventual comonomer and hydrogen are introduced into the second polymerisation reactor together with the polymer. However, this is generally not sufficient to maintain desired propylene concentration in the second polymerisation reactor. Therefore additional propylene is typically introduced into the second polymerisation reactor. It is introduced to maintain a desired propylene concentration in the fluidisation gas.

It is also often necessary to introduce additional hydrogen into the second polymerisation reactor to control the melt index of the first polymer mixture. Suitably, the hydrogen feed is controlled to maintain constant hydrogen to propylene ratio in the fluidisation gas. The actual ratio depends on the catalyst. Good results have been obtained by maintaining the ratio within the range of from 0.1 to 3 mol/kmol, preferably from 0.15 to 2 mol/kmol.

In a fluidised bed gas phase reactor olefins are polymerised in the presence of a polymerisation catalyst in an upwards moving gas stream. The reactor typically contains a fluidised bed comprising the growing polymer particles containing the active catalyst, said fluidised bed having its base above a fluidisation grid.

The polymer bed is fluidized with the help of the fluidisation gas comprising the olefin monomer, eventual comonomer(s), eventual chain growth controllers or chain transfer agents, such as hydrogen, and eventual inert gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidisation gas for compensating losses caused, among other, by reaction or product withdrawal.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP-A600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be greater than minimum fluidisation velocity of the particles contained in the fluidised bed, as otherwise no fluidisation would occur. On the other hand, the velocity of the gas should be less than the transport velocity, as otherwise the whole bed would be entrained with the fluidisation gas. The bed voidage then is then typically less than 0.8, preferably less than 0.75 and more preferably less than 0.7. Generally the bed voidage is at least 0.6. An overview is given, among others in Geldart: Gas Fluidization Technology, J.Wiley & Sons, 1986 in chapters 2.4 and 2.5 (pages 17-18) as well as in chapters 7.3 to 7.5 (pages 169-186, especially FIG. 7.21 on page 183).

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor and cooled in a heat exchanger to remove the heat of reaction. The gas is cooled to a temperature which is less than that of the bed to prevent the bed from heating because of the reaction. It is possible to cool the gas to a temperature where a part of it condenses. When the liquid droplets re-enter the fluidised bed they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidisation gas stream for compensating losses caused by the reaction and product withdrawal. It is generally known to analyse the composition of the fluidisation gas and introduce the gas components to keep the composition constant. The actual gas composition is determined by the desired properties of the product and the catalyst used in the polymerisation.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

The polymeric product may be withdrawn from the gas phase reactor either continuously or intermittently. Continuous withdrawal is preferred. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

Third Polymerisation Reactor

In the third polymerisation reactor a heterophasic copolymer comprising the first polymer mixture and a third copolymer of propylene is formed. This is done by introducing the particles of the first polymer mixture, containing active catalyst dispersed therein, together with additional propylene and comonomer into the third polymerisation reactor. Hydrogen may be introduced for controlling the molecular weight. This causes the third copolymer to form on the particles containing the first polymer mixture.

The melt index $MFR_2$ of the heterophasic copolymer is from 0.05 to 2.0 g/10 min, preferably from 0.1 to 1.0 g/10 min and more preferably from 0.15 to 0.5 g/10 min.

As explained above for the first polymer mixture, the $MFR_2$ of the third copolymer of propylene cannot be measured because the third copolymer cannot be isolated from the heterophasic copolymer. However, the $MFR_2$ of the third copolymer of propylene can be calculated by using equation 1 above. In that case the component 1 is the first polymer mixture, component 2 is the third copolymer and the final blend is the heterophasic copolymer. It can then be found that the $MFR_2$ of the third copolymer is about the same as the $MFR_2$ of the first polymer mixture. It is also possible to estimate the $MFR_2$ of the third copolymer of propylene by analysing the intrinsic viscosity of the polymer fraction which remains soluble in xylene at 25° C., measured according to ISO 16152.

Hydrogen feed is adjusted to achieve a desired melt flow rate (or molecular weight) of the polymer. Suitably, the hydrogen feed is controlled to maintain constant hydrogen to propylene ratio in the reaction mixture. The actual ratio depends on the catalyst as well as the type of the polymerisation. Good results have been obtained in gas phase polymerisation by maintaining the ratio within the range of from 1 to 100 mol/kmol, preferably from 2 to 80 mol/kmol.

The third copolymer is elastomeric. By "elastomeric" is meant that the third copolymer is substantially amorphous, having substantially no crystalline fraction. Additionally or alternatively, the third copolymer remains soluble in xylene at 25° C., measured according to ISO 16152.

The comonomer is selected from ethylene, alpha-olefins containing 4 to 10 carbon atoms and their mixtures. The comonomer used in the third polymerisation reactor may be the same as or different from the comonomer used in the preceding polymerisation reactors, if any had been used. Especially preferably, ethylene is used as the comonomer in the third polymerisation reactor.

The content of the comonomer is controlled to obtain the desired comonomer content of the heterophasic copolymer. Typically the heterophasic copolymer contains from 5 to 25% by mole of units derived from the comonomer and from 75 to 95% by mole of propylene units. Preferably the heterophasic copolymer contains from 5.0 to 20% by mole of units derived from the comonomer and from 80 to 95.0% by mole of propylene units.

As discussed above for the first polymer mixture the comonomer content of the third copolymer cannot be directly measured.

According to one method the comonomer content of the third copolymer can be calculated by using equation 2 above. In that case the component 1 is the first polymer mixture, component 2 is the third copolymer and the final blend is the heterophasic copolymer. Typically, the third copolymer of propylene comprises from 35 to 75% by mole of comonomer units and from 25 to 65% by mole of propylene units. Preferably the third copolymer of propylene comprises from 35 to 70% by mole of comonomer units and from 30 to 65% by mole of propylene units.

According to another method, the comonomer content of the third copolymer is determined from the polymer fraction which remains soluble in xylene at 25° C. The comonomer content is measured from this fraction according to the methods known to the person skilled in the art.

The comonomer to propylene ratio that is needed to produce the desired comonomer content in the polymer depends, among others, on the type of comonomer and the type of catalyst. With ethylene as a comonomer good results have been obtained in gas phase polymerisation with a molar ratio of ethylene to propylene of 200 to 700 mol/kmol, preferably from 250 to 650 mol/kmol and in particular from 300 to 600 mol/kmol.

The heterophasic copolymer comprises from 65 to 86% by weight of the first polymer mixture, preferably from 70 to 86%, and from 14 to 35% by weight of the third copolymer, preferably from 14 to 30%. As discussed above, preferably the first and second polymers are homopolymers and the third polymer is a copolymer of propylene and ethylene.

The content of the xylene soluble polymer at 25° C. in the third copolymer cannot be directly measured. The amount can be estimated by using equation 4 above In that case the component 1 is the first polymer mixture, component 2 is the third polymer and the final blend is the heterophasic copolymer. The third polymer typically can be found to have a content of xylene soluble polymer of at least 80% by weight, preferably at least 90% by weight, such as at least 95% by weight.

The third polymerisation stage is preferably conducted in a fluidised bed gas phase reactor as described above for the second polymerisation stage.

Post Reactor Treatment

When the polymer mixture has been removed from the third polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer mixture is preferably mixed with additives as it is well known in the art. Such additives include antioxidants, process stabilizers, neutralizers, lubricating agents, nucleating agents, pigments and so on.

The polymer mixture is then extruded to pellets as it is known in the art. Preferably a co-rotating twin screw extruder is used for the extrusion step. Such extruders are manufactured, for instance, by Coperion and Japan Steel Works.

Heterophasic Copolymer

The heterophasic copolymer produced according to the process of the present invention is a copolymer of propylene with a comonomer selected from the group consisting of ethylene, alpha-olefins having from 4 to 10 carbon atoms, and mixtures thereof. Preferably there is only one comonomer and especially preferably the comonomer is ethylene. Typically the heterophasic copolymer comprises from 5 to 25% by mole of units derived from the comonomer and from 75 to 95% by mole of propylene units.

The heterophasic copolymer produced according to the process of the present invention has $MFR_2$ of from 0.05 to 2.0 g/10 min, preferably from 0.1 to 1.0 g/10 min and more preferably from 0.15 to 0.5 g/10 min.

The heterophasic copolymer produced according to the process of the present invention preferably has a fraction of xylene soluble polymer determined according to ISO 16152 of from 14 to 35% by weight, more preferably from 14 to 30% by weight.

It is further preferred that the intrinsic viscosity measured from the amorphous polymer fraction, i.e., the fraction which remains soluble in xylene at 25° C. and precipitates upon addition of acetone, is from 1.5 to 4.4 dl/g, more preferably from 2.0 to 4.4 dl/g. Alternatively or additionally, the content of comonomer units measured from the amorphous polymer fraction is preferably from 35 to 75% by mole and more preferably from 35 to 70% by mole, such as from 35 to 60% by mole.

The heterophasic copolymer produced according to the process of the present invention preferably has a total content of comonomer units of from 5.0 to 20% by mole and the content of units derived from propylene of from 80 to 95% by mole.

The heterophasic copolymer produced according to the process of the present invention preferably has a flexural modulus of from 700 to 1700 MPa, more preferably from 750 to 1600 MPa. It preferably further has a notched Charpy impact strength measured at −20° C. measured according to ISO179 using specimen 1eA of at least 3.5 kJ/m$^2$, more preferably at least 4.0 kJ/m$^2$. Said notched Charpy impact strength measured at −20° C. will normally not exceed a value of 30 kJ/m$^2$. Said notched Charpy impact strength measured at 23° C. will normally have a value from 75 to 150 kJ/m$^2$.

The heterophasic copolymer produced according to the process of the present invention does not contain any phthalic acid esters which would originate from the manufacturing process.

Due to the increased productivity the resulting polymer has a reduced content of catalyst residues, such as residual titanium, magnesium and/or aluminium. For instance, the magnesium content in the heterophasic copolymer is preferably not more than 30 ppm and more preferably not more than 20 ppm. Normally it is not possible to avoid magnesium in the polymer altogether and the content is typically at least 1 ppm, like at least 2 ppm. While it is possible to reduce the content further by washing the polymer, for instance, with alcohols this adds complexity to the process and increases the investment and operating costs thereof. Therefore washing steps are usually not preferred.

Thus, the heterophasic copolymer produced according to the process of the present invention has a broad molecular weight distribution combined with a low level of catalyst residues and it does not contain any phthalate originating from the production process.

Especially, the heterophasic copolymer comprises:

(1) A first polymer of propylene, selected from homopolymers of propylene and random copolymers of propylene containing from 0.1 to 5% by mole of a comonomer selected from the group consisting of ethylene, alpha-olefins having from 4 to 10 carbon atoms, and mixtures thereof and having a melt flow rate $MFR_2$ of from 0.1 to 4.0 g/10 min;

(2) a second polymer of propylene, selected from homopolymers of propylene and random copolymers of propylene containing from 0.1 to 5% by mole of a comonomer selected from the group consisting of ethylene, alpha-olefins having from 4 to 10 carbon atoms, and mixtures thereof and having a melt flow rate $MFR_2$ of from 0.05 to 0.3 g/10 min and which is less than the MFR$_2$ of the first polymer of propylene;

(3) a third polymer of propylene selected from random copolymers of propylene containing from 35 to 75% by mole of units of a comonomer selected from the group consisting of ethylene, alpha-olefins having from 4 to 10 carbon atoms and mixtures thereof.

Preferably the first polymer of propylene and the second polymer of propylene are homopolymers of propylene. Further, preferably the third polymer is a copolymer of propylene and ethylene.

Furthermore, the heterophasic copolymer preferably comprises from 24 to 59% by weight of the first polymer of propylene, from 28 to 64% by weight of the second polymer of propylene and from 2 to 30% by weight of the third polymer of propylene. The percentage figures are based on the total weight of the heterophasic copolymer. Especially preferably, the first and second polymers of propylene are present in such amounts that the ratio of the weight of the first polymer to the weight of the second polymer is from 35:65 to 60:40 and the third polymer is present in such amount that the ratio of the combined weight of the first and second polymers of propylene to the weight of the third polymer of propylene is from 70:30 to 98:2.

Such heterophasic copolymer has the properties as defined above, and especially MFR$_2$ and content of comonomer units as defined above.

Pipes Made of Heterophasic Copolymers

Furthermore, the present invention relates to sheets, profiles, fittings, and pipes, like pipe fittings, in particular non-pressure pipes, comprising, preferably comprising at least 75 wt.-%, more preferably comprising at least 90 wt.-%, like at least 95 wt.-%, most preferably consists of, a heterophasic copolymer as defined in the instant invention.

The term "pipe" as used herein is meant to encompass hollow articles having a length greater than diameter. Moreover the term "pipe" shall also encompass supplementary parts like fittings, valves and all parts which are commonly necessary for e.g. a indoor soil and waste or underground sewage piping system.

Pipes according to the invention encompass solid wall pipes and structured wall pipes. Solid wall pipes can be single layer pipes or multilayer pipes, however it is preferred that the solid wall pipe is a single layer pipe. Structured wall pipes preferably consist of two layers, one of which is a smooth inner layer while the other is a corrugated, spiral wound or ribbed outer layer. More preferably the inventive composition is comprised in at least one of the layers of such a structured wall pipe.

The heterophasic copolymer used for pipes according to the invention may contain usual auxiliary materials, e. g. up to 10 wt.-% fillers and/or 0.01 to 2.5 wt.-% stabilizers and/or 0.01 to 10 wt.-% processing aids and/or 0.1 to 1.0 wt.-% antistatic agents and/or 0.2 to 3.0 wt.-% pigments and/or reinforcing agents, e. g. glass fibres, in each case based on the heterophasic copolymer used (the wt.-% given in this paragraph refer to the total amount of the pipe and/or a pipe layer comprising said heterophasic copolymer).

BENEFITS OF THE INVENTION

The heterophasic copolymers of the invention are produced in a manner where polymer with higher melt flow rate is produced in the first polymerisation reactor and polymer with lower melt flow rate is produced in the second polymerisation reactor. In this way a greater productivity of the catalyst can be obtained. This gives very good impact strength to the heterophasic copolymers both at ambient and sub-zero temperatures resulting from combination of high amount of xylene soluble fraction with low intrinsic viscosity of amorphous polymer. Typically multiple reactors are operated in a manner where lower melt flow rate polymers is produced in the first reactor and higher melt flow rate polymer is produced in the second reactor. The productivity of the catalyst is lower in this manner and the polymers produced have lower impact strength values.

Description of Methods

Melt Flow Rate

Melt flow rate (MFR, MFR$_2$) was determined according to ISO 1133 at 230° C. under the load of 2.16 kg.

The melt flow rate MFR$_2$ is herein assumed to follow the following mixing rule (equation 1):

$$MI_b = (w_1 \cdot MI_1^{-0.0965} + w_2 \cdot MI_2^{-0.0965})^{-\frac{1}{0.0965}} \quad \text{(eq. 1)}$$

Where w is the weight fraction of the component in the mixture, MI is the melt index MFR$_2$ and subscripts b, 1 and 2 refer to the mixture, component 1 and component 2, respectively.

Content of Comonomer

Ethylene content, i.e., the content of ethylene units in propylene polymer was measured by Fourier transmission infrared spectroscopy (FTIR). A thin film of the sample (thickness approximately 250 μm) was prepared by hot-pressing. The area of —CH2-absorption peak (800-650 cm$^{-1}$) was measured with Perkin Elmer FTIR 1600—spectrometer. The method was calibrated by ethylene content data measured by $^{13}$C NMR.

The comonomer content is herein assumed to follow the mixing rule (equation 2):

$$C_b = w_1 \cdot C_1 + w_2 \cdot C_2 \quad \text{(eq. 2)}$$

where C is the content of comonomer in weight-%, w is the weight fraction of the component in the mixture and subscripts b, 1 and 2 refer to the overall mixture, component 1 and component 2, respectively.

Xylene Soluble

The amount of xylene soluble fraction was determined according to ISO 16152, 5$^{th}$ edition (2005 Jul. 1). The amount of polymer which remains dissolved at 25° C. is given as the amount of xylene soluble polymer.

The amorphous polymer (AM) is obtained by separating the xylene soluble polymer from the undissolved polymer and precipitating the amorphous polymer from the solution with acetone (100 ml acetone per 100 ml of solution) at 25° C.

The content of xylene soluble polymer is herein assumed to follow the mixing rule (equation 4):

$$XS_b = w_1 \cdot XS_1 + w_2 \cdot XS_2 \quad \text{(eq. 4)}$$

Where XS is the content of xylene soluble polymer in weight-%, w is the weight fraction of the component in the mixture and subscripts b, 1 and 2 refer to the overall mixture, component 1 and component 2, respectively.

Flexural Modulus

The flexural modulus was determined in 3-point-bending at 23° C. according to ISO 178 on 80×10×4 mm$^3$ test bars injection moulded in line with EN ISO 1873-2.

Charpy Notched Impact Strength

Charpy notched impact was measured according to ISO 179/1eA at +23° C. and at −20° C. on 80×10×4 mm$^3$ test bars injection moulded in line with EN ISO 1873-2.

Intrinsic Viscosity

The intrinsic viscosity (iV) value increases with the molecular weight of a polymer. The iV values e.g. of the XCS were measured according to ISO 1628/1 in decalin at 135° C. The iV(AM) was measured from the amorphous polymer in similar manner.

Comonomer Content

Quantitative Fourier transform infrared (FTIR) spectroscopy was used to quantify the amount of comonomer. The content of comonomer units was measured from a 300 µm thick film pressed from the polymer. The film was pressed at 180° C. in a conventional manner using a mould with 28 mm diameter. The film was inspected to confirm the absence of air bubbles. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

The C$_2$(AM) was measured from the amorphous polymer in similar manner except that the thickness of the film was 100 µm.

Ash Content

The total ash content of the polymer was measured by combusting the polymer in an oven at 750° C. The polymer sample (about 20 grams) was weighed into a platinum fire pot. Then the pot containing the sample was placed into the oven and kept there at 750° C. for 15 minutes. The pot was weighed and the amount of ash in the pot was determined. The ash content was given as the fraction of the residual material from the total polymer amount.

Magnesium Content

The content of magnesium was determined from the ash. The ash obtained from the combustion as described above was dissolved in 5 ml nitric acid under heating so that the ash sample dissolved. The solution was then diluted with distilled water to 100 ml and filtered through a 0.45 µm filter. The metal content was determined from the filtered solution by ICP (Inductively Coupled Plasma).

EXAMPLES

Catalyst Preparation
Used Chemicals:
2-ethylhexanol, provided by Amphochem
3-Butoxy-2-propanol—(DOWANOL™ PnB), provided by Dow
bis(2-ethylhexyl)citraconate, provided by SynphaBase
TiCl$_4$, provided by Millenium Chemicals
Toluene, provided by Aspokem
Viscoplex® 1-254, provided by Evonik
Heptane, provided by Chevron 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25° C., after which the reactor temperature was raised to 90° C. within 30 minutes. The reaction mixture was stirred for a further 30 minutes at 90° C. Afterwards stirring was stopped and the reaction mixture was allowed to settle for 15 minutes at 90° C. The solid material was washed 5 times: Washings were made at 80° C. under stirring for 30 min with 170 rpm. After stirring was stopped the reaction mixture was allowed to settle for 20-30 minutes and followed by siphoning.

Wash 1: Washing was made with a mixture of 100 ml of toluene and 1 ml donor.
Wash 2: Washing was made with a mixture of 30 ml of TiCl$_4$ and 1 ml of donor.
Wash 3: Washing was made with 100 ml of toluene.
Wash 4: Washing was made with 60 ml of heptane.
Wash 5: Washing was made with 60 ml of heptane under 10 minutes stirring.

Afterwards stirring was stopped and the reaction mixture was allowed to settle for 10 minutes while decreasing the temperature to 70° C. with subsequent siphoning, followed by N$_2$ sparging for 20 minutes to yield an air sensitive powder.

Example 1

A stirred tank reactor having a volume of 45 dm$^3$ was operated as liquid-filled at a temperature of 30° C. and a pressure of 54 bar. Into the reactor was fed propylene so much that the average residence time in the reactor was 0.36 hours together with 0.98 g/h hydrogen, 70 g/h of ethylene and 4.3 g/h of a polymerisation catalyst prepared according to Catalyst Preparation Example above with triethyl aluminium (TEA) as a cocatalyst and dicyclopentyldimethoxysilane (DCPDMS) as external donor so that the molar ratio of TEA/Ti was about 76 mol/mol and TEA/DCPDMS was 8 mol/mol. The slurry from this prepolymerisation reactor was directed to a loop reactor having a volume of 150 dm$^3$ together with 170 kg/h of propylene and hydrogen so that the molar ratio of hydrogen to propylene was 0.12 mol/kmol. The loop reactor was operated at a temperature of 80° C. and a pressure of 51 bar. The production rate of propylene copolymer was 29 kg/h and the melt flow rate MFR$_2$ was 0.56 g/10 min.

The polymer slurry from the loop reactor was directly conducted into a first gas phase reactor operated at a temperature of 80° C. and a pressure of 25 bar. Into the reactor were fed additional propylene and hydrogen, as well as nitrogen as inert gas, so that the content of propylene was 83% by mole and the ratio of hydrogen to propylene was 1 mol/kmol. The production rate in the reactor was 47 kg/h and the polymer withdrawn from the reactor had a melt flow rate MFR$_2$ of 0.34 g/10 min. The split of the polymer produced in the loop reactor to the polymer produced in the gas phase reactor was 38:62.

The polymer from the first gas phase reactor was conducted into a second gas phase reactor operated at a temperature of 70° C. and a pressure of 16 bar. Into the reactor were fed additional propylene, ethylene and hydrogen, as well as nitrogen as inert gas, so that the content of propylene was 63% by mole, the ratio of ethylene to propylene was 310 mol/kmol, the ratio of hydrogen to ethylene was 22 mol/kmol and the ratio of hydrogen to propylene was 7 mol/kmol. The production rate in the reactor was 11 kg/h. The polymer was withdrawn from the reactor and the hydrocarbons were removed by purging with nitrogen. The resulting polymer had a melt flow rate MFR$_2$ of 0.25 g/10 min and an ethylene content of 7.3% by weight. The split of the polymer produced in the loop and the first gas phase reactors to the polymer produced in the second gas phase reactor was 86:14.

The polymer powder withdrawn from the reactor was mixed with a combination of 0.1 wt % of Pentaerythrityl-tetrakis(3-(3',5'-di-tert. butyl-4-hydroxyphenyl)-propionate (CAS No. 6683-19-8, commercially available as Irganox 1010 from BASF AG, Germany) and 0.1 wt % of Tris (2,4-di-t-butylphenyl) phosphite (CAS No. 31570-04-4, commercially available as Irgafos 168 from BASF AG, Germany) as antioxidants, and 0.05 wt % of calcium stearate (CAS No. 1592-23, commercially available as Calcium stearate SP from Faci SpA, Italy) as acid scavenger. The mixture of polymer and additives was then extruded to pellets by using a ZSK70 extruder (product of Coperion, Germany) under nitrogen atmosphere at a barrel temperature of 200-240° C., followed by strand pelletisation after cooling in a water bath. The resulting polymer pellets were subsequently used for characterization.

Example 2

The procedure of Example 1 was followed except that the operation conditions in the loop reactor and the gas phase reactors were modified as shown in Table 1.

Examples 3 and 4

The procedure of Example 1 was repeated except that the TEA/Ti ratio was about 68 mol/mol, the TEA/DCPDMS ratio was 8 mol/mol and the catalyst feed rate was 6.1 g/h. Further, the conditions were as indicated in Table 1.

Comparative Example 1

The procedure of Example 1 was followed except that the operation conditions in the loop reactor and the gas phase reactors were modified as shown in Table 1.

Comparative Example 2

The solid catalyst component was prepared according to Inventive Example 1 of EP 2796501 A1. The process was conducted as in Inventive Example 1 of EP 2796501 A1.

Comparative Example 3

The solid catalyst component was prepared according to Example 2 in WO 00/68315. The process was conducted as in Inventive Example 1 in EP 2539398 A1.

From Table 2 it can be seen that the resulting polymers are characterized by a low melt flow rate (MFR), making them especially suitable for extrusion processes and especially for pipe extrusion for producing pipes having good low-temperature toughness. The very high toughness of these heterophasic copolymers both at ambient and sub-zero temperatures result from combination of high amount of xylene soluble fraction with a limited intrinsic viscosity of the amorphous copolymer.

TABLE 1

Polymerisation conditions and some properties measured from the polymer

| | Example | | | | | | |
|---|---|---|---|---|---|---|---|
| | 1 | 2 | 3 | 4 | CE1 | CE2 | CE3 |
| Prepol Temperature, ° C. | 30 | 30 | 20 | 20 | 20 | 33 | 30 |
| Loop Temperature, ° C. | 80 | 80 | 80 | 80 | 80 | 72 | 68 |
| Loop H$_2$/C$_3$ mol/kmol | 0.12 | 0.16 | 0.23 | 0.22 | 0.044 | 0.53 | 0.04 |
| Loop C$_2$/C$_3$ mol/kmol | 0 | 0 | 0 | 0 | 0 | 0 | 6 |
| Loop MFR$_2$, g/10 min | 0.56 | 0.42 | 0.67 | 0.62 | 0.12 | 0.87 | 0.044 |
| Loop XS, % by weight | 4.0 | ND | 2.5 | 2.5 | 3.2 | 5.1 | 8 |
| GPR1 Temperature, ° C. | 80 | 80 | 80 | 80 | 80 | 80 | 80 |
| GPR1 Pressure, Bar | 25 | 25 | 20 | 20 | 20 | 29 | 19 |
| GPR1 H$_2$/C$_3$ mol/kmol | 1 | 1 | 0.3 | 0.2 | 0.8 | 1.9 | 31 |
| GPR1 MFR$_2$, g/10 min | 0.34 | 0.34 | 0.34 | 0.31 | ND | 0.36 | 0.66 |
| GPR1 C$_2$/C$_3$ mol/kmol | 0 | 0 | 0 | 0 | 0 | 0 | 22 |
| GPR1 XS, % by weight | 1.6 | 1.5 | 2.0 | 2.0 | 2.1 | 4.5 | 4.5 |
| Split, Loop:gpr1 | 38:62 | 41:59 | 58:42 | 58:42 | 52:48 | 41:59 | 27:73 |
| GPR2 Temperature, ° C. | 70 | 65 | 65 | 61 | 60 | 80 | 90 |
| GPR2 Pressure, Bar | 16 | 16 | 16 | 16 | 16 | 24 | 27 |
| GPR2 H$_2$/C$_3$ mol/kmol | 7 | 6 | 75 | 73 | 75 | 0.47 | 0 |
| GPR2 C$_2$/C$_3$ mol/kmol | 310 | 330 | 570 | 550 | 550 | 50 | 0 |
| Final MFR$_2$, g/10 min | 0.25 | 0.24 | 0.43 | 0.33 | 0.30 | 0.27 | 0.34 |
| Final C$_2$-content % by weight (mole) | 7.3 (11) | 6.8 (9.9) | 12 (17) | 12 (16) | 9.7 (13.9) | 4.0 (5.9) | 2.6 |
| Final XS, % by weight | 15 | 18 | 23 | 25 | 27 | ND | 4.1 |
| Split (Loop + gpr1):gpr2 | 86:14 | 83:17 | 78:22 | 75:25 | 74:26 | 94:6 | 92:8 |
| IV of AM, dl/g | 4.3 | 4.1 | 2.5 | 2.3 | 2.3 | ND | ND |

TABLE 1-continued

Polymerisation conditions and some properties measured from the polymer

| | Example | | | | | | |
|---|---|---|---|---|---|---|---|
| | 1 | 2 | 3 | 4 | CE1 | CE2 | CE3 |
| C$_2$-content % of AM % by weight (mole) | 37 (47) | 37 (47) | 42 (52) | 44 (54) | 42 (52) | ND | ND |
| Total catalyst productivity, kg PP/g cat | 18 | 17 | 13 | 14 | 4.0 | ND | ND |
| Mg-content in polymer, ppm | 9 | 9 | 12 | 11 | 40 | ND | ND |

ND = not determined;
AM denotes the fraction which remains soluble in xylene at 25° C.

TABLE 2

Polymer characteristics

| | | Example | | | | |
|---|---|---|---|---|---|---|
| | | 2 | 3 | 4 | CE2 | CE3 |
| MFR 230° C./2.16 kg | g/10 min | 0.24 | 0.43 | 0.33 | 0.27 | 0.34 |
| Flex. modulus ISO178 | MPa | 1320 | 808 | 869 | 1000 | 1160 |
| Charpy NIS ISO179 1eA 23° C. | kJ/m$^2$ | 104 | 88 | 83 | 60 | 13.8 |
| Charpy NIS ISO179 1eA 0° C. | kJ/m$^2$ | ND | ND | ND | 8.2 | 4.4 |
| Charpy NIS ISO179 1eA −20° C. | kJ/m$^2$ | 8.3 | 6.6 | 4.4 | ND | ND |

The invention claimed is:

1. A process for producing a heterophasic copolymer composition comprising propylene monomer and a comonomer selected from ethylene, alpha-olefins having 4 to 10 carbon atoms and their mixtures, in the presence of an olefin polymerisation catalyst comprising a solid catalyst component and a co-catalyst, wherein the solid catalyst component comprises titanium, magnesium, halogen and an internal donor, the process comprising the steps of:
(1) introducing streams of the solid catalyst component, the cocatalyst, propylene monomer and hydrogen into a first polymerisation reactor;
(2) producing a first polymer of propylene in the first polymerisation reactor, the first polymer of propylene having a first melt flow rate MFR$_2$ of from 0.1 to 2.0 g/10 min;
(3) withdrawing a stream comprising the first polymer of propylene from the first polymerisation reactor and passing it to a second polymerisation reactor;
(4) introducing a stream of propylene monomer into the second polymerisation reactor;
(5) producing a first polymer mixture comprising the first polymer of propylene and a second polymer of propylene in the second polymerisation reactor, the first polymer mixture having a second melt flow rate MFR$_2$ of from 0.05 to 1.0 g/10 min and which second melt flow rate is less than the first melt flow rate;
(6) withdrawing a stream comprising the first polymer mixture from the second polymerisation reactor and passing it to a third polymerisation reactor;
(7) introducing streams of propylene monomer and the comonomer into the third polymerisation reactor;
(8) producing the heterophasic copolymer composition comprising the first polymer mixture and a third copolymer of propylene in the third polymerisation reactor, the heterophasic copolymer composition having a third melt flow rate MFR$_2$ of from 0.05 to 1.0 g/10 min, said heterophasic copolymer composition having a content of comonomer units of from 5 to 25% by mole;
wherein the amount of xylene soluble fraction in the heterophasic copolymer determined according to ISO 16152 is from 14 to 35% by weight and intrinsic viscosity measured from an amorphous polymer (AM) of the heterophasic copolymer is from 1.5 to 4.4 dl/g; and
(9) recovering the heterophasic copolymer composition from the third polymerisation reactor; wherein the internal donor is a compound having the structure according to formula (I):

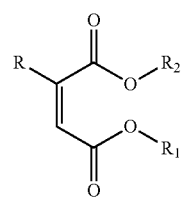

(I)

wherein R$_1$ and R$_2$ are the same or different being a linear or branched C$_1$-C$_{12}$-alkyl group and R is hydrogen or a linear, branched or cyclic C$_1$ to C$_{12}$-alkyl.

2. The process according to claim 1 wherein the compound having the structure according to formula (I) is a bis(2-ethylhexyl) citraconate.

3. The process according to claim 1 wherein the first polymer of propylene is a homopolymer of propylene.

4. The process according to claim 1 wherein the second polymer of propylene is a homopolymer of propylene.

5. The process according to claim 1 wherein the first polymer mixture comprises from 35 to 60% by weight of the first polymer of propylene and from 40 to 65% by weight of the second polymer of propylene.

6. The process according to claim 1 wherein the heterophasic copolymer composition comprises from 65 to 86% by weight of the first polymer mixture and from 14 to 35% by weight of the third copolymer.

7. The process according to claim 6 wherein the heterophasic copolymer composition comprises from 70 to 86% by weight of the first polymer mixture and from 14 to 30% by weight of the third copolymer.

8. The process according to claim 1 wherein the first polymerisation reactor is a loop reactor.

9. The process according to claim 1 wherein the second polymerisation reactor is a gas phase reactor.

10. The process according to claim 1 wherein the third polymerisation reactor is a gas phase reactor.

11. The process according to claim 1 wherein the third polymer is a copolymer of propylene and ethylene.

12. The process according to claim 11 wherein the molar ratio of ethylene to propylene in the third polymerisation reactor is from 200 to 700 mol/kmol.

* * * * *